United States Patent Office 2,966,059
Patented Dec. 27, 1960

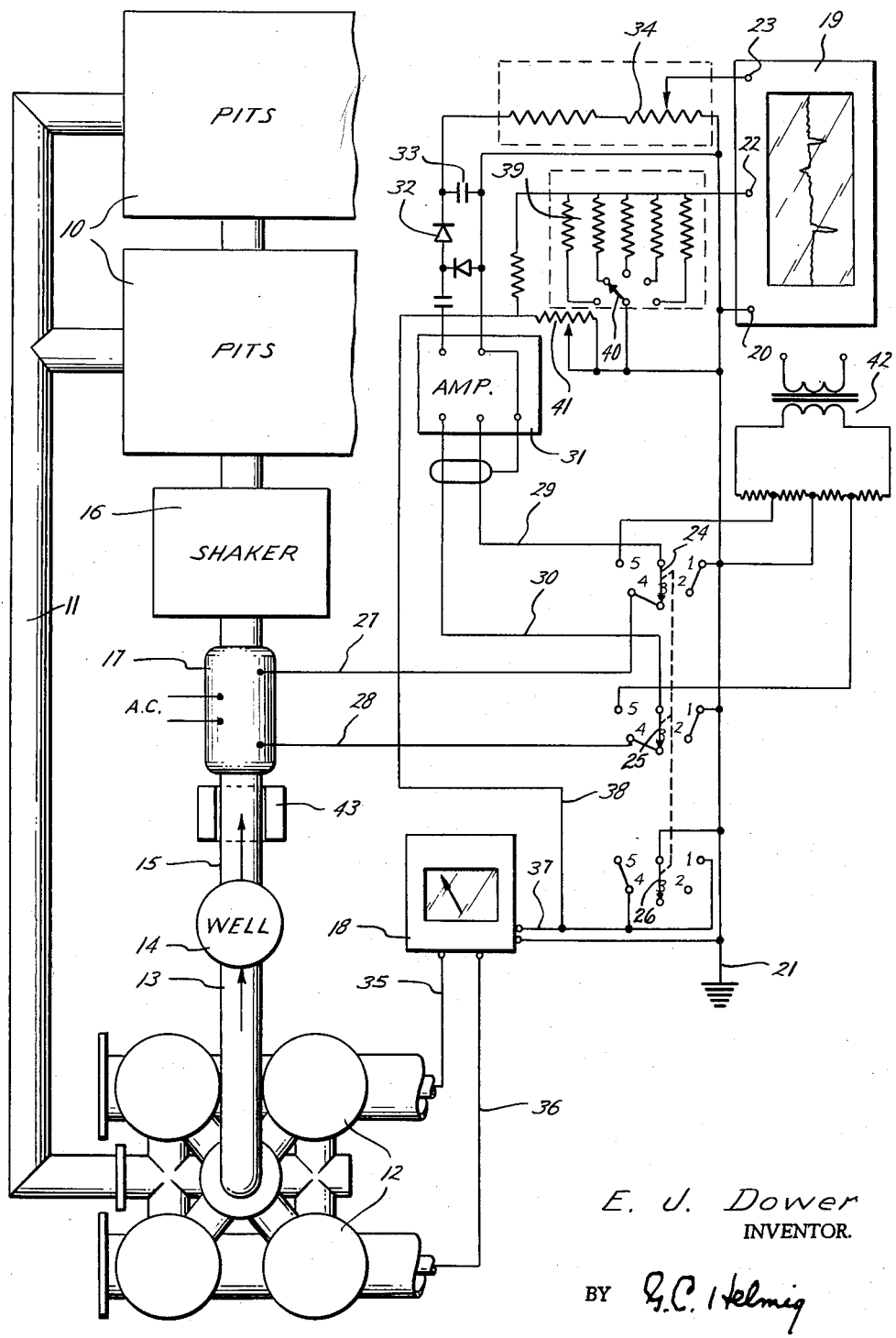

2,966,059

INDICATOR OF DRILLING MUD GAIN AND LOSS

Ethell J. Dower, Houston, Tex., assignor to Warren Automatic Tool Company, Houston, Tex., a corporation of Texas Filed Feb. 10, 1958, Ser. No. 714,252

6 Claims. (Cl. 73—155)

This invention relates to improved instrumentation especially applicable for indicating relative inflow and outflow of fluids to and from a well during the operation of deeply penetrating the earth, as in the drilling of gas and oil wells. Returns to the surface of pump circulated mud and entrainments therein after having been supplied through the drill string to the bottom drill tool and back up through the open bore afford a continuous gauge of well hole conditions including the type and content of formations being penetrated. For example, mud pit level is observed from time to time for abnormal change as an indication either that mud is being lost into or is being increased by additions from the formations but visual observation made irregularly is unreliable for taking prompt remedial measures such as correction of mud density. Furthermore, level changes can go unnoticed in large capacity pits whose liquid content change may be significant without much level change. To provide better harnessing of the returns and a constant and accurate indication of conditions and which indication is at all times observable at the station of the operator responsible for drilling procedure and who, therefore, has prompt warnings of changes which need action, is one of the primary objects of this invention.

Another object of the invention is to provide electrical equipment including a pair of signal transmitting devices responsive respectively to changes in well outflow volume and changes in input volume and improved signal carrying circuitry containing compensatory controls adjustably related to operating conditions and suitable current modifying units whereby both signal sources are joined to voltage indicator means for correlation by which constant showings are available of relative inflow and outflow.

The attached drawing is a schematic diagram illustrating parts of a well mud circulation system and an electrical indicating arrangement for the system.

In the drawing the conventional pits wherein drilling mud is stored and compounded to prescribed density and composition are indicated as a pair of tanks 10 having a pump intake pipe 11 leading to one or more piston and cylinder pumps 12 for operation in supplying drilling mud through the flow pipe 13 to the drill string in a well 14. Outflow mud from the open well bore is piped back to the pits 10 through a conduit 15 and the usual shaker 16.

Signals transmitted from an outflow transmitter 17 and from a pump stroke counter 18 are received by a differential input recording potentiometer 19 located near the draw works. The meter 19 is a well known type of voltage sensitive instrument and consists of feed and wind-up rolls for a scaled paper strip to travel at a constant rate under a marking pen which can swing to either side of a center position in response to voltage differences in two separate circuits, which is to say that the marking pen is centered when the circuit voltages are in balance and goes to one side or the other in proportion to the extent of voltage unbalance. An observable and a permanent record or historical trace is thus made of the relative inflow and outflow of mud to and from a well being drilled and the record can be interpreted with reference to many operating conditions as reflected by the character and interval of pump operations, such as down time for changing bits as well as gains and losses of fluids and how quickly corrections were made.

The voltage sensitive recorder 19 is shown as having one terminal 20 connected with a grounded wire 21 and a pair of input terminals 22 and 23 for normal circuit connection with the signal sending devices 17 and 18, which respond respectively to mud outflow and inflow from and to the well. Both circuits are under control of a multiple blade switch including the switch blades 24, 25, and 26, all fixed on a common rock shaft for manual manipulation and blade movement in unison, each with respect to a different group of contacts, and the corresponding contact locations or switch positions for each switch blade are conveniently labeled in the drawings by the similar reference characters 1, 2, 3, 4 and 5. Reference will be made later to the various switch positions but for normal relative inflow and outflow indications the several switch blades will be set each at its number 3 position, as shown in the drawing.

The outflow transmitter 17 is a commercially available electromagnetic flow transducer. It consists of a fluid flow tube forming a part of the outflow conduit 15 and being surrounded by electric coils whose power requirements are 115 volts, 60 cycles, and 200 watts, and whose magnetic field is focused at right angles to the flowing fluid. Voltage induced by the flow of fluid through the magnetic fields is proportional to flow velocity and is detected by electrodes and passes through conductors 27 and 28 leading to Nos. 3 and 4 contacts for the switch blades 24 and 25 so that the No. 3 switch blade position the conductor wires 29 and 30 convey signals produced by the transducer as alternating 60 cycle voltage and can be registered as a direct linear measurement of fluid flow volume through the transducer. This 60 cycle voltage is very small and is on the order of a few millivolts for full scale volume rating of the transducer. It is amplified by suitable electronic means and rectified to direct current voltage to facilitate its cooperation with the other flow signal.

The two signal carrying wires from the transducer 17 should be encased in a shielding conduit which is electrically grounded. The A.C. millivolt signal is fed into a balanced input A.C. amplifier 31 having a gain of one thousand, which amplifies signal voltage. The output of this amplifier 31 is single ended and there is a single output signal lead which alternates in voltage with respect to the grounded wire 21. This amplified A.C. signal is then rectified to D.C. voltage. Rectification is by an arrangement of germanium diodes, such as shown at 32, and co-operating condensers, as shown at 33, and the D.C. output voltage from the amplifier will be proportional to outflow rate at the transducer 17 and appear as positive voltage above ground. It is fed into a voltage dividing resistance network 34 whose variable resistance serves as a calibrating adjustment for the outflow signal. Positive voltage from this power divider is fed to the input terminal 23 of the differential recording potentiometer 19. A positive voltage appearing at this terminal of the zero center recorder drives the marker pen in the right-hand direction across the traveling chart.

The electrical signal which is proportional to input flow to the well is obtained directly from the mud pumps used to pump mud down into the hole and is a measure of the frequency of pump strokes. As these pumps are of the piston type, they have a positive displacement and an electrical signal proportional to pump speed can be related directly to pump volumetric output. An arrangement for electrically measuring pump stroke rate is available from Well Logging Equipment Manufacturing Company, Houston, Texas, under the trademark Wemco Pump Stroke Counter. It involves a pump actuated make and break switch to open and close an electric circuit on each pump stroke for impressing a given charge per cycle on a large capacity measuring circuit containing a microammeter and germanium diodes which offer resistance in the measuring circuit and have the characteristic of increasing and decreasing resistance in relation respectively to voltage drop and rise in response to pulse repeat timing so that the charging pulses are smoothed out and voltage bleedoff to the meter is directly proportional to pump cycle timing and approximates voltage impressed on the measuring circuit throughout the range of pump stroke rate. The meter having a scale graduated in pump strokes gives a measure of pump stroke rate and promptly and accurately reflects changes in pump stroke speed. The pump stroke counter inclusive of its circuitry is a commercial item available on the market as a package and is, therefore, indicated generally as a housing unit 18 in the drawing, there also being housed therein a selector switch by which either or both of a pair of stroke actuated circuit make and break contacts of dual pumps are connected by conductors 35 and 36 with the pump stroke counter 18. According to this invention, the current after having actuated the stroke counter indicator, follows the conductor 37 tied in to each of the contacts 1, 4, and 5, with which the switch blade 26 co-operates, and is also tied by the conductor 38, which leads eventually to the input terminal 22 of the potentiometer 19. Various additions to the circuitry allow for conversion or modification of the pump stroke voltage level signal to represent various calculated flow rates obtained with particular piston sizes and stroke lengths. An adjustable control is also provided to compensate for the volumetric efficiency of a given pump. This instrumentation in effect uses the standard mud pump as a positive displacement type flow meter.

Whether one or more pumps are actuated at any time, the make and break switch or switches cause a discreet quantity of electricity to be metered to the strokes-per-minute indicator for each pump cycle and these intermittent flows of direct current are smoothed out as beforementioned to a steady D.C. current flow proportional to the strokes-per-minute speed of the pump. As this is a current metering device and the potentiometer 19 is responsive to voltage, it is necessary to convert the current signal into a voltage signal for combining the signals of the first and second circuits for the proper operation of the voltage sensitive recorder. Therefore, with the switch blade 26 at No. 3 position, current from the stroke counter 18 is passed through a selected one of a group of fixed resistors, indicated at 39, and to the ground 21. The voltage drop across this resistor is then a function of the current and the resistance. As this resistance is fixed, the voltage drop is proportional to the current flowing or to the pump stroke rate. The resistance value is determined by consideration of pump size, that is, piston diameter and stroke length. The size of this resistor is such that the voltage drop across it for a given stroke rate corresponds to the voltage signal from the flow transducer at a volumetric flow rate equivalent to the theoretical output of the pump at this stroke rate.

The several resistors of the group each corresponds to a different pump size and the correct resistor for each pump on the rig is coupled into the circuit by the switch blade 40. The several resistances shown can be selectively brought into the circuit and it will be understood that if the rig utilizes several pumps for supplying mud, then the stroke length and piston diameter of each will determine which resistance element to be employed and the selector switch 40 will be adjusted accordingly, and furthermore if more than one pump is used at a time, then the switch blade 40 would close the shunt circuit through a resistor whose resistance is determined for the combined output capacity of the pumps. One side of these resistors being grounded through the switch 40, there will be developed on the other side a positive D.C. voltage as a result of current flow. This positive voltage is fed directly to the input terminal 22 of the recorder. It may be here mentioned that the recorder is a null-balance type potentiometer and does not draw any current but simply measures a voltage potential. The insertion of a resistor 39 into the strokes-per-minute indicator circuit does not disrupt that signal or cause an error in the indicated stroke rate because no current is lost to the recorder. This positive voltage fed to the recorder 19 tends to drive the marker pen in the left-hand direction.

If the positive voltage from the flow transducer 17 and the positive voltage from the stroke rate indicator 18 are equal, there is no difference in voltage at the input to the recorder and the pen remains on center zero, indicating no difference in input or output flow. If the input flow signal is larger than the output flow signal, the pen will move toward the left in an amount corresponding to the voltage difference or the difference between the two flow rates. This left-hand reading is designated as a loss, as more fluid is entering the hole than is coming out. On the other hand, if the signal from the flow transducer is the larger, the pen will move correspondingly to the right of zero for indicating a gain of fluid from the hole.

The voltage developed across the resistors in the pump rate meter is made proportional to the theoretical displacement of the mud pump but since these mud pumps do not generally operate at one hundred percent efficiency, an adjustable control is placed in the circuit containing these resistors so that a portion of the current can bypass around them. Any percentage of bypass current reduces the voltage across the resistors by an equal percentage. Such control is shown as a variable resistance, as at 41 connecting the line 38 and the ground 21, and if this adjustable control is set, for example, to bypass twenty percent of the current around a particular resistor 39, then the voltage appearing at this resistor will be twenty percent less than the theoretical voltage corresponding to one hundred percent efficiency. This control is provided to compensate for wear in the pump which alters its volumetric efficiency.

When there is indicated a gain or loss on recorder 19 and doubt exists as to whether this is an actual gain or loss of mud within the hole or is merely a change in pump efficiency, the question can be checked in any one of several different manners. If there is a marked loss accompanied by a decrease in pump pressure, it will be known that the pump is not putting out as much mud as it should. Pump pressure drop is a good indication that pump efficiency is going down. One way of verifying pump efficiency is to change back to another mud pump whose efficiency was known when it was last run. If this pump is put on the hole and the instrument is set to known efficiency of the pump and there still is an indicated loss or gain, the actual occurrence of loss or gain is therefore indicated. Another method of checking is to shift the output of the pump directly through the flow meter and bypassing the hole so that the flow meter 17 is directly measuring the output of the pump with no change for a gain or loss of mud, and pump efficiency can thus be directly determined. Still another method for checking the situation is to observe pit level at the time a change occurs. For example, if the instrument indicates a twenty gallon per minute loss for a period of ten minutes, the total loss is two hundred gallons, and if it is actual loss in the hole, there will be a corresponding decrease in pit level. Generally, pit level decrease for two hundred gallons will be a very small amount but careful measurements can be taken over this short period as a check on meter indications of gain or loss.

While in normal drilling operations the five position three pole switch represented in the drawing by the blades 24, 25, and 26 will be in the No. 3 position, adjustments to other positions will serve certain desirable purposes. Thus if the switch is moved to the No. 1 position, both input leads to the A.C. amplifier 31 are grounded and additionally the pump stroke signal is grounded directly, and no signal goes to either side of the recorder 19. In this grounding or short position the electrical zero of the recorder may be checked and the pen, if away from center, can be adjusted to the center scale zero. The commercial instrument regularly has a manual knob by which centering through relative adjustment between the pen and the paper rolls may be effected. At position No. 2 of the multiple switch, both input leads of the A.C. amplifier again are grounded but the pump stroke signal is fed through one of the resistors 39 to drive the recorder toward the left from zero for registering the flow rate of the input mud. In the No. 4 position, the output of the pump stroke counter is grounded directly, and both input leads of the A.C. amplifier 31 are coupled to the flow transducer 17 for recording the well outflow rate. In the No. 5 position of the switch blade, the pump stroke counter is again grounded directly while the input leads to the A.C. amplifier 31 are coupled to a fixed calibration signal. The signal is obtained from a transformer, shown at 42, which receives alternating current from a supply line of 115 volts and provides a fixed signal of known value in terms of flow rate for the particular flow rate transducer and therefore moves the marker pen away from zero toward the right for a check of the reading for a known voltage.

In drilling operations, fragments of broken or drilled out metal parts and magnetic substances in formations being drilled may constitute mud entrained particles which on reaching the magnetic field of the transducer 17 will continue on through if the flow velocity is high enough to exceed the magnetic attraction. Should flow velocity at any time be of a small value, the magnetic particles may tend to gather and collect within the magnetic field and can affect the generation of forces in a manner to result in false readings. To prevent such occurrences, it is here proposed to surround the outflow pipe 15 by a permanent magnet 43, preferably a detachable collar made in hinged sections joined together and located just ahead or in upstream advance of the transducer 17. In relation to the electromagnetic field the strength of the permanent magnet will be greater but not to interfere with the electromagnetic field. It attracts any iron or steel particles entrained in the mud stream when the flow rate is low or intermittent so as to prevent or greatly reduce collection of the particles in the more sensitive zone of the electromagnetic field. When the flow rate again is increased, the fluid will pull the collection of particles from the field of the permanent magnet and flush them on through the weaker A.C. magnetic field.

From the above description it will be apparent that there is provided a practical and fully reliable arrangement for application to the drilling operation of an oil well for giving an immediate indication and a continuing record of any gain or loss of mud fluid in the bore hole as well as other data of significant value. The gain or loss signal is independent of other operations carried on at the surface for affecting the total volume of the mud system in general. The invention comprehends the particular system as described and such modification thereof as may come within the scope of the attached claims.

What is claimed is:

1. Instrumentation for comparative measurement of inflow and outflow of well drilling fluids or the like, including a direct current voltage responsive differential recording potentiometer having a pair of input terminals, a first current transmitting circuit connected to one of said input terminals, a magnetic flow meter transmitter responsive to well fluid outflow for transmitting through said circuit an alternating current of voltage proportional to fluid outflow volume, current modifying means contained in said circuit to amplify said alternating current and to rectify the same for actuation of said potentiometer and a second current transmitting circuit having connection with the other of said input terminals and having current transmitting means therein whose voltage varies in response to the stroke cycle rate of pump mechanism supplying inflow fluid to the well, as a measure of inflow volume and for current transmission to said potentiometer, a group of fixed resistance elements adapted for connection separately in said second current transmitting circuit in grounded parallel relationship with said potentiometer and each resistance element being of a different predetermined resistance than the others in terms of known conditions in displacement of several inflow supply pumps and a switch operable to place individual resistance elements selectively in said second circuit.

2. Instrumentation for comparative measurement of inflow and outflow of well drilling fluids or the like, including a direct current voltage responsive differential recording potentiometer having a pair of input terminals, a first current transmitting circuit connected to one of said input terminals, a magnetic flow meter transmitter responsive to well fluid outflow for transmitting through said circuit an alternating current of voltage proportional to fluid outflow volume, current modifying means contained in said circuit to amplify said alternating current and to rectify the same for actuation of said potentiometer and a second current transmitting circuit having connection with the other of said input terminals and having current transmitting means therein whose voltage varies in response to the stroke cycle rate of pump mechanism supplying inflow fluid to the well, as a measure to inflow volume and for current transmission to said potentiometer, said second circuit having therein a fixed resistance of a value predetermined in relation to pump supply volume.

3. Instrumentation for comparative measurement of inflow and outflow of well drilling fluids or the like, including a direct current voltage responsive differential recording potentiometer having a pair of input terminals, a first current transmitting circuit connected to one of said input terminals, a magnetic flow meter transmitter responsive to well fluid outflow for transmitting through said circuit an alternating current of voltage proportional to fluid outflow volume, current modifying means contained in said circuit to amplify said alternating current and to rectify the same for actuation of said potentiometer and a second current transmitting circuit having connection with the other of said input terminals and having current transmitting means therein whose voltage varies in response to the stroke cycle rate of pump mechanism supplying inflow fluid to the well, as a measure of inflow volume and for current transmission to said potentiometer, a resistor selected for a voltage drop thereacross predetermined in relation to a given pump stroke rate and means for selectively placing said resistor in the second circuit to control voltage in the second circuit and measured at said potentiometer.

4. Instrumentation for comparative measurement of inflow and outflow of well drilling fluids or the like, including a direct current voltage responsive differential recording potentiometer having a pair of input terminals, a first current transmitting circuit connected to one of said input terminals, a magnetic flow meter transmitter responsive to well fluid outflow for transmitting through said circuit an alternating current of voltage proportional to fluid outflow volume, current modifying means contained in said circuit to amplify said alternating current and to rectify the same for actuation of said potentiometer and a second current transmitting circuit having connection with the other of said input terminals and having current transmitting means therein whose voltage varies in response to the stroke cycle rate of pump mechanism supplying inflow fluid to the well, as a measure of inflow volume and for current transmission to said potentiometer, variable resistance means arranged in said second circuit in parallel circuit relation with the potentiometer and selectively operable means controlling said variable resistance means for adjusting circuit voltage in compensation for changes in pump efficiency.

5. Instrumentation for comparative measurement of inflow and outflow of well drilling fluids or the like, including a direct current voltage responsive differential recording potentiometer having a pair of input terminals, a first current transmitting circuit connected to one of said input terminals, a magnetic flow meter transmitter responsive to well fluid outflow for transmitting through said circuit an alternating current of voltage proportional to fluid outflow volume, current modifying means contained in said circuit to amplify said alternating current and to rectify the same for actuation of said potentiometer and a second current transmitting circuit having connection with the other of said input terminals and having current transmitting means therein whose voltage varies in response to the stroke cycle rate of pump mechanism supplying inflow fluid to the well, as a measure of inflow volume and for current transmission to said potentiometer, a series of resistance elements arranged for incorporation in said second circuit in shunt relationship with the potentiometer, one of said devices being a variable resistor for shunting circuit voltage in compensation for changes in inflow supply pump efficiency and an adjustable selector switch operable to place other of the resistor devices individually in said shunt relationship and each having resistances different from the others and predetermined to compensate for differences in displacements of different pumps to be employed for inflow supply.

6. Instrumentation for comparative measurement of inflow and outflow of well drilling fluids or the like, including a direct current voltage responsive differential recording potentiometer having a pair of input terminals, a first current transmitting circuit connected to one of said input terminals, a magnetic flow meter transmitter responsive to well fluid outflow for transmitting through said circuit an alternating current of voltage proportional to fluid outflow volume, current modifying means contained in said circuit to amplify said alternating current and to rectify the same for actuation of said potentiometer and a second current transmitting circuit having connection with the other of said input terminals and having current transmitting means therein whose voltage varies in response to the stroke cycle rate of pump mechanism supplying inflow fluid to the well, as a measure of inflow volume and for current transmission to said potentiometer, said potentiometer having a movable indicator responsive to voltage differential in said first and second circuits for movement in either direction from a centered position when the voltages of the two circuits are out of balance, a multiposition switch means operable to open and close the respective circuits and also to cut out both current transmitters and a source of known constant voltage alternating current connected by the switch when both transmitters are out of the circuits so that the current from said source will be directed through said signal amplifying and rectifying means for a functional test of potentiometer response.

References Cited in the file of this patent

UNITED STATES PATENTS

| | | |
|---|---|---|
| 1,308,626 | Crowell | July 1, 1919 |
| 2,252,367 | Germer | Aug. 12, 1941 |
| 2,290,179 | Hayward | July 21, 1942 |
| 2,290,408 | Crites | July 21, 1942 |
| 2,491,606 | Dickey et al. | Dec. 20, 1949 |
| 2,685,796 | Romanowski et al. | Aug. 10, 1954 |
| 2,691,303 | De Boisblanc | Oct. 12, 1954 |
| 2,722,122 | Soffel | Nov. 1, 1955 |